May 6, 1924.

R. RYCHIGER ET AL 1,492,812

APPARATUS FOR PRODUCING EDGED WORK PIECES

Filed Dec. 1, 1922

4 Sheets-Sheet 1

May 6, 1924.
R. RYCHIGER ET AL
1,492,812
APPARATUS FOR PRODUCING EDGED WORK PIECES
Filed Dec. 1, 1922  4 Sheets-Sheet 2
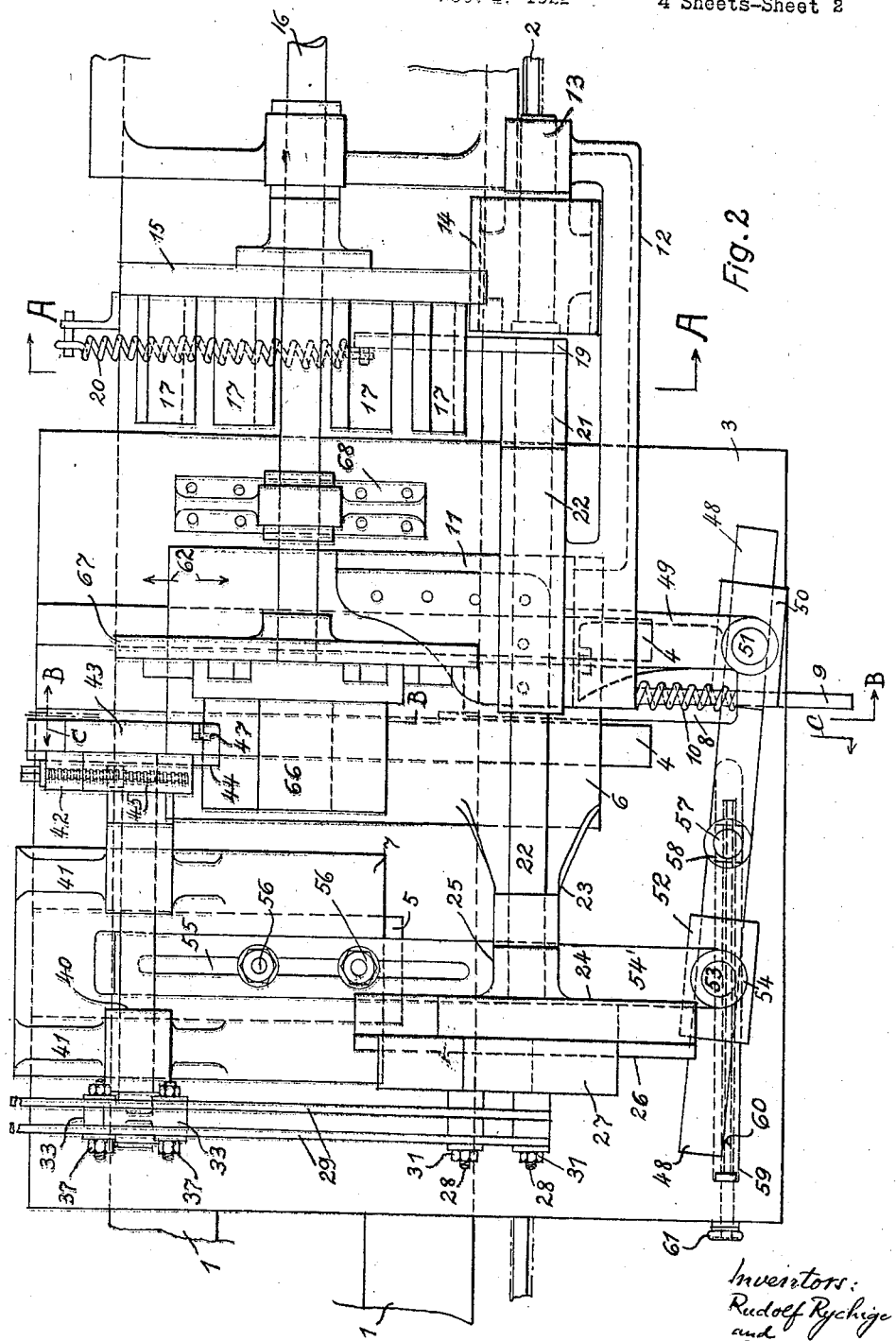

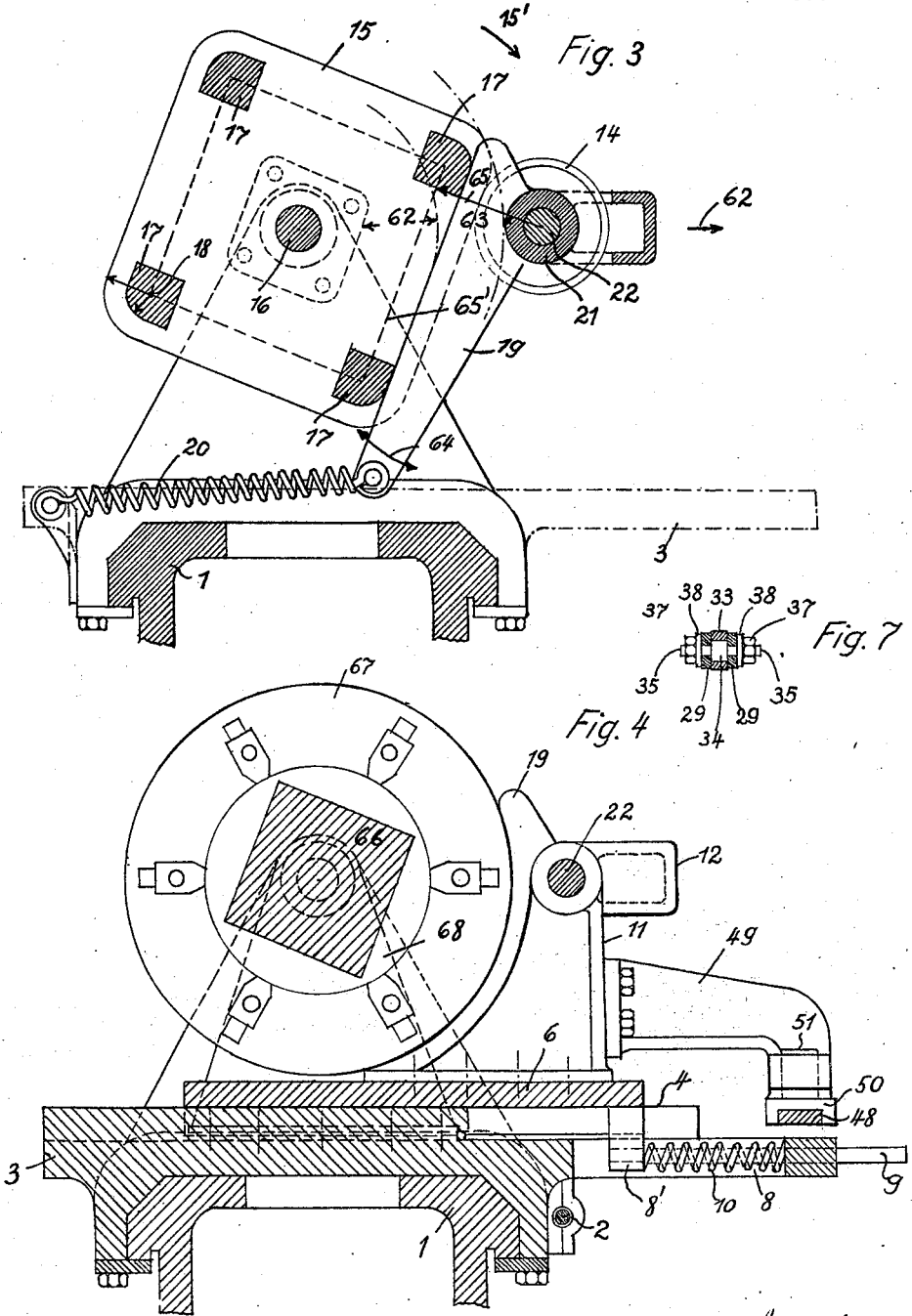

Patented May 6, 1924.

1,492,812

UNITED STATES PATENT OFFICE.

RUDOLF RYCHIGER AND ERNST KÜPFER, OF STEFFISBURG, SWITZERLAND.

APPARATUS FOR PRODUCING EDGED-WORK PIECES.

Application filed December 1, 1922. Serial No. 604,455.

*To all whom it may concern:*

Be it known that we, RUDOLF RYCHIGER and ERNST KÜPFER, both Swiss citizens, residing at Steffisburg, Canton Bern, Switzerland, have invented certain new and useful Improvements in Apparatus for Producing Edged-Work Pieces (for which we have filed applications in Switzerland, 16th December, 1921; Germany, 29th November, 1921; France, 30th December, 1921; Italy, 2nd January, 1922; England, 9th January, 1922), of which the following is a specification.

Our invention relates to means for producing edged work pieces on a lathe by turning, boring and the like operations according to a pattern.

In the apparatus according to our invention an oscillating copying lever is used adapted to reciprocate together with a slide held in contact with the rotatable pattern so as to be operated thereby. The slide carrying the said copying lever is connected with another slide carrying the tool holder by means of a two-armed lever so that the tool holder will oscillate synchronously with the copying lever, the tool holder also being movable longitudinally. Means are also provided for adjusting the pivot of the said two-armed lever so that the distance of the axis of rotation of the said lever from the points of its connection with the said two slides can be varied, whereby the ratio of transmission of the transverse movement of the two slides is also varied.

The two slides are carried by a longitudinally movable slide which is provided with a slot in which the pivot of the said two-armed lever is slidably mounted, a spindle being provided in the said slot for adjusting the pivot in said slot. The connecting means of the said two-armed lever with the two transverse slides comprises two guide-plates, which are slidably mounted on the arms of the said two-armed lever and are pivotally connected to brackets of the two transverse slides.

Figure 1:
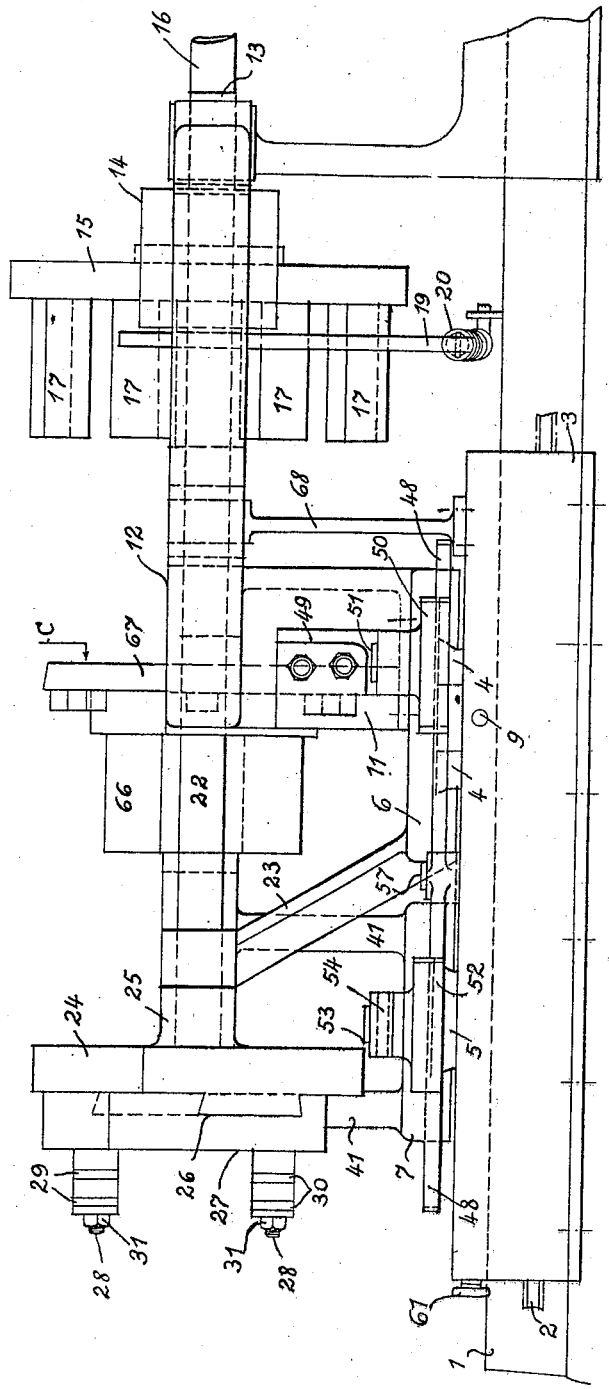
Figure 5:
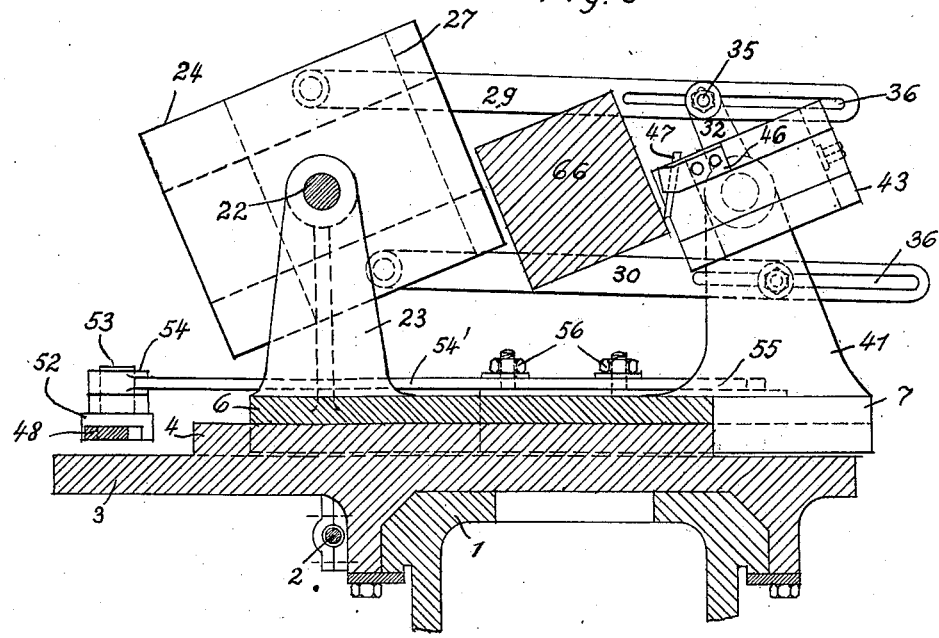
Figure 6:
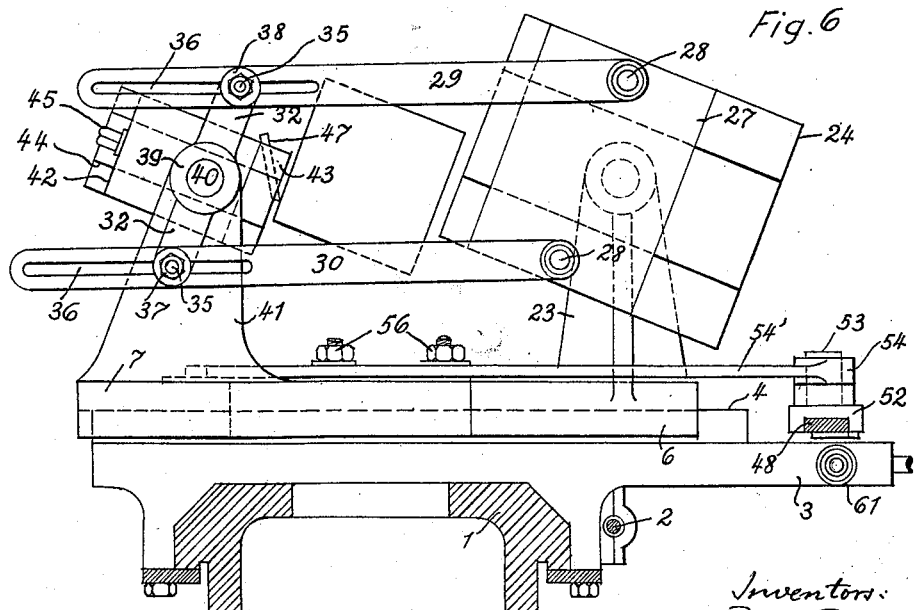

In the accompanying drawings showing by way of example one construction of the improved apparatus, Fig. 1 is an elevation of our new apparatus,

Fig. 2 a plan,

Fig. 3 a section on line A—A of Fig. 2,

Fig. 4 a section on line B—B of Fig. 2,

Fig. 5 a section on line C—C of Fig. 2,

Fig. 6 an end view seen from the left hand side of Fig. 1 or 2, while

Fig. 7 shows a detail in section.

Upon the longitudinal frame member 1 of the lathe is slidably mounted a longitudinal slide 3 which is driven by the spindle 2. The slide 3 is provided with two transversely arranged guides 4 and a further transverse guide rail 5. A cross slide 6 is adapted to be reciprocated upon the guide rails 4, whilst the tool slide 7 is adapted to be reciprocated upon the guide rail 5. Into a transverse slot 8 of the longitudinal slide 3 projects a nose or projection 8' provided upon the under face of the cross slide 6. Into this projection is screwed the end of the rod 9 which projects outwardly through a suitable bore of the slide 3 and carries a spiral spring 10 interposed between the nose or projection 8' and the slide 3. Upon the cross slide 6 is mounted an upright bearing 11 which is provided with a lateral extension or arm 12. The extension 12 carries a pivot 13 upon which is rotatably mounted a roller 14. This roller 14 is pressed by the spiral spring 10 acting upon the slide 6, against the periphery of a square pattern 15 which is fixedly mounted upon the machine spindle 16 and carries upon its front face four studs 17. The corners of the pattern 15 and the corresponding corners of the studs 17 are concentrically rounded off. A one-armed copying lever 19 is pressed by a tension spring 20 acting upon its lower end against the stud 17 adjacent thereto at the time being. The copying lever 19 is fixedly mounted by means of its hub 21 upon a shaft 22. This shaft is supported in an upright bearing 11 and in another upright bearing 23 integral with the cross slide 6. Upon the other end of the shaft 22 is fixedly mounted a guide plate 24 by means of its hub 25. The guide plate 24 is provided with a dove-tail shaped guide bar 26 upon which is movably mounted a slide 27. Fast to the slide 27 are two pivots bolts 28 to which are pivoted two connecting rods 29, 30. These rods are secured upon the bolts 28 by means of screw nuts 31 (Fig. 1). The connecting rods 29, 30 are connected to the two arms of a two-armed lever 32. The end portions of this lever 32 are provided with eyes 33 in each of which is mounted a turnable pivot bolt 34 (Fig. 7). The bolts 34 are provided with reduced threaded portions 35 which pass through longitudinal slots 36 of the rods 29 and 30 respectively. Upon each threaded portion 35 is provided a screw nut 37 with a washer 38. The rods 29, 30 are fixed to the pivot bolts 34 by means of the nuts 37. The two-armed lever 32 is fixedly mounted by means of its hub 39 upon a shaft 40. This shaft rests in two upright bearings 41 integral with or fixed to the tool slide 7, and carries upon its end a guide plate 42. With a longitudinal groove (not shown in the drawings) of the guide plate 42 engages a guide bar 44 of the tool holder 43. The tool holder may be adjusted along the guide plate 42 by means of a spindle 45, and carries a steel cutter 47 which is let into a groove of the tool holder and is secured by means of a clamping plate 46.

The cross slide 6 is connected with the tool slide 7 by means of a two armed lever 48. For this purpose, a forwardly projecting arm or extension 49 is provided upon the upright bearing 11. Upon this arm 49 is rotatably mounted a guide plate 50 by means of a pivot bolt 51. With the guide plate 51 engages the lever 48. The other end of this lever engages with a slotted guide plate 52 which is pivotally mounted by means of a pivot 53 in an eye 54 formed at the end of a bar 54' fixed to the tool slide 7. This bar 54' is provided with a longitudinal slot 55 and is secured to the slide by means of two screws 56 so that it may be adjusted in its longitudinal direction. The two-armed lever 48 is pivotally mounted upon a vertical pivot 57. This pivot is arranged upon a support 58 which may be adjusted within a longitudinal slot 59 of the slide 3. The adjustment of the pivot 57 is effected by means of a screw spindle 60 passing through the bore of the support 58 and adapted to be actuated by means of a hand wheel 61.

The operation is as follows:—

The pattern 15 rotates in the direction of the arrow 15', presses against the roller 14 and causes the cross slide 6 to reciprocate in the direction of the arrows 62 the distance 63 (Fig. 3). The transverse movement of the slide 6 is transmitted by the two-armed lever 48 to the tool slide 7. At the same time the copying lever 19 is oscillated in the direction of the arrows 64 (Fig. 3). The oscillations of the copying lever 19 are transmitted by the shaft 22 to the slide 27 and from this slide to the two-armed lever 32, and through the shaft 40 to the tool holder 43.

The transverse movement of the tool slide 7 may be made greater or less than the movement of the cross slide 6 by suitable adjustment of the pivot 57. In the illustrated construction the cross movements of the tool slide 7 and the cross slide 6 are in the proportion of 2:3.

The same proportion obtains also between the length of the tool lever arm, that is, the distance of the cutting edge of the cutter 47, and the axis of rotation of the shaft 40, and the vertical distance 65 between the axis of rotation of the shaft 22 and the pattern 65' (Fig. 3). Owing to this adjustment of the apparatus, the length of each side of the square work piece 66 is only two-thirds of the length of the pattern square 65'.

The work piece is fixed to a disc 67 fixedly mounted upon the machine spindle 16. The machine spindle 16 is supported between the pattern 15 and the disc 67 by means of an upright bearing 68 mounted upon the longitudinal slide 3. The longitudinal slide with the parts mounted thereon may during the working of the work piece advance approximately the length of the stud 17. When producing sharp edged work pieces, the tool slide 7 is, after loosening the screws 56, first adjusted until the distance of the axis of rotation of the shaft 40 from the axis of rotation of the work piece bears the same ratio to the distance of the axis of rotation of the copying lever 19 from the axis of rotation of the pattern 15, as the length of the side of the square work piece to be produced to the length of the square pattern 65'. The screws 56 are then tightened, and the tool holder 43 is gradually advanced until the work is finished.

It may be pointed out that the transmission of the oscillating movement of the copying lever to the tool holder may obviously be effected by any other suitable means. The main features of the invention are the means for transmitting the transverse movement of the slide 6 to the tool slide 7. Various other features of the construction illustrated in the drawings form the subject of a co-pending application.

While we have described the embodiments of our invention in great detail, we desire it to be understood that we do not desire to be limited to the exact details shown and described, as many changes may be made therein without departing from the spirit of our invention.

We claim:—

1. An apparatus for producing edged work pieces by turning, boring or a like operation comprising in combination: A rotatable pattern; a transverse slide; a copying lever mounted on said cross slide and adapted to oscillate about its axis of rotation and to reciprocate together with the said transverse slide, said copying lever being in contact with and operated by said pattern; a two-armed lever a second transverse slide connected to the first named transverse slide by the said two-armed lever; a tool holder mounted upon the said second transverse slide and adapted to oscillate synchronously with the copying lever, said tool holder being longitudinally movable; and means for adjusting the pivot of the said two-armed lever connecting the two transverse slides and consequently the distance of the axis of rotation of said lever from the points of connection of the two transverse slides, for the purpose of varying the ratio of transmission of the transverse movement of the said two slides, in order to vary the size of the work piece to be produced from a single pattern.

2. The apparatus as specified in claim 1, comprising a longitudinal slide carrying the said two transverse slides and provided with a slot, the pivot of the said two-armed lever being slidably mounted in the said slot, a spindle in said slot for adjusting the said pivot therein, the connecting means of the said two-armed lever with the said two transverse slides comprising two guide-plates slidably mounted upon the arms of the said two-armed lever and pivotally connected to brackets of the said two transverse slides.

3. The apparatus as specified in claim 1, comprising a longitudinal slide carrying the said two transverse slides and provided with a slot, the pivot of the said two-armed lever being slidably mounted in the said slot, a spindle in said slot for adjusting the said pivot therein, the connecting means of the said two-armed lever with the said two transverse slides comprising two guide-plates slidably mounted upon the arms of the said two-armed lever and pivotally connected to brackets of the said two transverse slides, and a longitudinally adjustable bar fixed to the said tool-slide, one of the said guide-plates being mounted on the said bar.

In testimony whereof we have hereunto set our hands in the presence of two witnesses:

RUDOLF RYCHIGER.
ERNST KÜPFER.

Witnesses:
A. BAILLEUR,
R. HEINGARTNER.